(12) United States Patent
Xu (10) Patent No.: US 12,105,345 B2
(45) Date of Patent: Oct. 1, 2024

(54) LENS MODULE

(71) Applicant: Changzhou AAC Raytech Optronics Co., Ltd., Changzhou (CN)

(72) Inventor: Tongming Xu, Shenzhen (CN)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 379 days.

(21) Appl. No.: 17/566,736

(22) Filed: Dec. 31, 2021

(65) Prior Publication Data

US 2023/0142964 A1 May 11, 2023

(30) Foreign Application Priority Data

Nov. 10, 2021 (CN) .......................... 202122747718.5

(51) Int. Cl.
*G02B 7/02* (2021.01)
*G02B 27/64* (2006.01)

(52) U.S. Cl.
CPC ........... *G02B 7/023* (2013.01); *G02B 27/646* (2013.01)

(58) Field of Classification Search
CPC ... G02B 7/04; G02B 7/08; G02B 7/09; G02B 7/023; G02B 7/025; G02B 27/646
See application file for complete search history.

(56) References Cited

U.S. PATENT DOCUMENTS

2022/0137486 A1* 5/2022 Oh .......................... G02B 7/08
359/554

FOREIGN PATENT DOCUMENTS

| CN | 110662999 A | * | 1/2020 | ............. G02B 27/64 |
| WO | WO-2018147100 A1 | * | 8/2018 | ............ G02B 27/646 |
| WO | WO-2020197149 A1 | * | 10/2020 | ............ G02B 27/646 |

OTHER PUBLICATIONS

Machine translation of WO 2018147100 A1, retrieved electronically from PE2E Search, Mar. 8, 2024 (Year: 2024).*
Machine translation of CN 110662999, retrieved electronically from PE2E Search, Mar. 8, 2024 (Year: 2024).*
Machine translation of WO-2020197149-A1, retrieved electronically from PE2E Search, Mar. 8, 2024 (Year: 2024).*

* cited by examiner

*Primary Examiner* — Cara E Rakowski
(74) *Attorney, Agent, or Firm* — W&G Law Group (57) ABSTRACT

The invention provides a lens module, including: a lens assembly having an optical axis; a first bracket; a first elastic plate suspending the lens assembly in the first bracket; a second bracket; a suspending wire; and a driving assembly for driving the lens assembly to move along the optical axis relative to the first bracket, and for driving the lens assembly to move in a direction perpendicular to the optical axis. The second elastic plate is fixed on the second bracket, and includes a fixed part fixedly connected to the second bracket and a deformation part. The deformation part performs elastic deformation along the optical axis relative to the fixed part for reducing the bending force of the suspending wire. Compared with prior art, a lens module of the present invention has an improved image optical stabilization function.

8 Claims, 9 Drawing Sheets

LENS MODULE

FIELD OF THE PRESENT DISCLOSURE

The present invention relates to the technical field of optical devices, in particular to a lens module with image stabilization function.

DESCRIPTION OF RELATED ART

With the rapid development of electronic product camera systems, OIS (Optical Image Stabilization) is widely used in electronic equipment. OIS means that in a camera or other similar imaging instruments, the lens is set for example to avoid or reduce the jitter of the instrument in the process of capturing optical signals, thereby improving the imaging quality. It uses movable parts to compensate the light path where the hand shake occurs, so as to achieve the effect of reducing the blur of the photo. In layman's terms, the camera equipped with optical image stabilization is movable. When the camera shakes unavoidably due to human movement, the OIS optical anti-shake system will drive the moving camera back to its original position through various algorithms and methods to achieve the anti-shake effect.

In the prior art, for the traditional OIS type VCM (English name: Voice Coil Motor, Chinese name: Voice coil motor), the structure of spring sheet and suspending wire is often used to realize the jitter reset of the OIS part. For example, by connecting one end of the suspending wire to the spring leaf and the other end to the base of the voice coil motor, it is possible to provide elastic restoring force to the OIS part connected to the spring leaf. However, the spring leaf is an integral design, and one end of the integral spring leaf is set on the OIS part. The other end is set on the voice coil motor. The spring plate of this design easily leads to poor stability of jitter reset in the OIS system, and easily affects the performance of the OIS system.

Therefore, it is necessary to provide a new type of lens module to solve the technical problem of poor stability of the jitter reset of the OIS driving part in the prior art.

SUMMARY OF THE PRESENT INVENTION

One of the main objects of the present invention is to provide a lens module with improved image optical stabilization function.

To achieve the above-mentioned objects, the present invention provides a lens module, including: a lens assembly having an optical axis; a first bracket sleeved outside the lens assembly; a first elastic plate connecting the lens assembly and the first bracket for suspending the lens assembly in the first bracket; a second bracket opposed from the first bracket along the optical axis; a suspending wire respectively connecting the first bracket and the second bracket and suspending and supporting the first bracket; a driving assembly for driving the lens assembly to move along the optical axis relative to the first bracket, and for driving the lens assembly to move in a direction perpendicular to the optical axis. The second elastic plate is fixed on the second bracket, and includes a fixed part fixedly connected to the second bracket and a deformation part extending from the fixed part and fixedly connected to the suspending wire; the deformation part performs elastic deformation along the optical axis relative to the fixed part for reducing the bending force of the suspending wire.

In addition the lens module further includes an electric circuit for providing power support to the lens module, wherein the electric circuit includes:
a first inserted member embedded in the first bracket, and electrically connected to an end of the suspending wire connected to the first bracket;
a second inserted member embedded in the second bracket, and electrically connected to another end of the suspending wire connected to the second bracket; and
a circuit connector arranged on the first bracket and electrically connected with the first inserted member.

In addition, the lens assembly includes a lens and a lens holder; the first elastic plate includes an upper elastic plate and a lower elastic plate opposite to the upper elastic plate; the upper elastic plate locates on a side of the first bracket facing the second bracket with one end thereof connected to the first bracket and another end connected to the lens holder; the lower elastic plate locates on a side of the first bracket away from the second bracket with one end thereof connected to the first bracket and another end connected to the lens holder.

In addition, the upper elastic plate, the lower elastic plate and the lens are electrically connected; the upper elastic plate and the lower elastic plate are also electrically connected to the circuit connector and electrically connected to the electrical circuit through the circuit connector.

In addition, first bracket includes a first activity area for deforming the suspending wire; the second bracket includes a second activity area corresponding to the first activity area.

In addition, both an inner wall of the first activity area and an inner wall of the second activity area are provided with an inclined plane inclined from the suspending wire toward the optical axis; both the first activity area and the second activity area are filled with damping glue for wrapping the suspending wire; the damping glue is used for providing buffer to the suspending wire.

In addition, the driving assembly includes a first driving assembly that drives the lens assembly to move in a direction of an optical axis and a second driving assembly that drives a first bracket to move in a direction perpendicular to the optical axis; the first driving assembly includes a first coil wound on the outside of the lens assembly and a magnet arranged at a distance from the first coil, and the magnet is arranged on the first bracket; the second driving assembly includes a second coil fixed on the second bracket; the second coil is directly opposite to the magnet.

In addition, the lens module further includes a first position detection unit arranged in the first bracket for detecting the moving position of the lens assembly along the optical axis.

In addition, the lens module further includes a second position detection unit located below the first bracket for detecting the moving position of the lens assembly in a direction perpendicular to the optical axis.

In addition, the second elastic plate further includes a force arm connected between the fixed part and the deformation part for providing displacement support for the deformation part when the second elastic plate is deformed.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain the disclosure, not intended to limit the disclosure.

Figure 1:
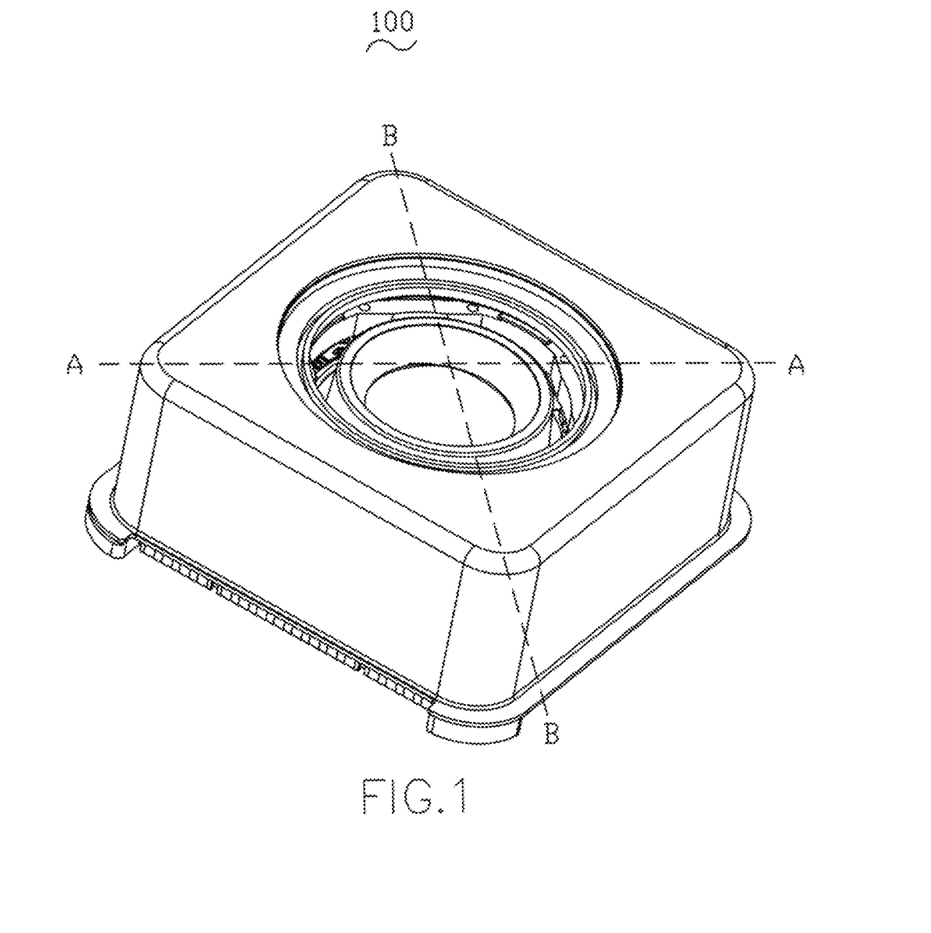
FIG. 1 is an isometric view of a lens module in accordance with an exemplary embodiment of the present invention.

Definitions: The first direction is the direction along the dashed line A-A in FIG. 1, and the second direction is the direction along the dashed line B-B in FIG. 1. The first bracket 3 and the second bracket 4 are arranged in a square shape.

Figure 2:
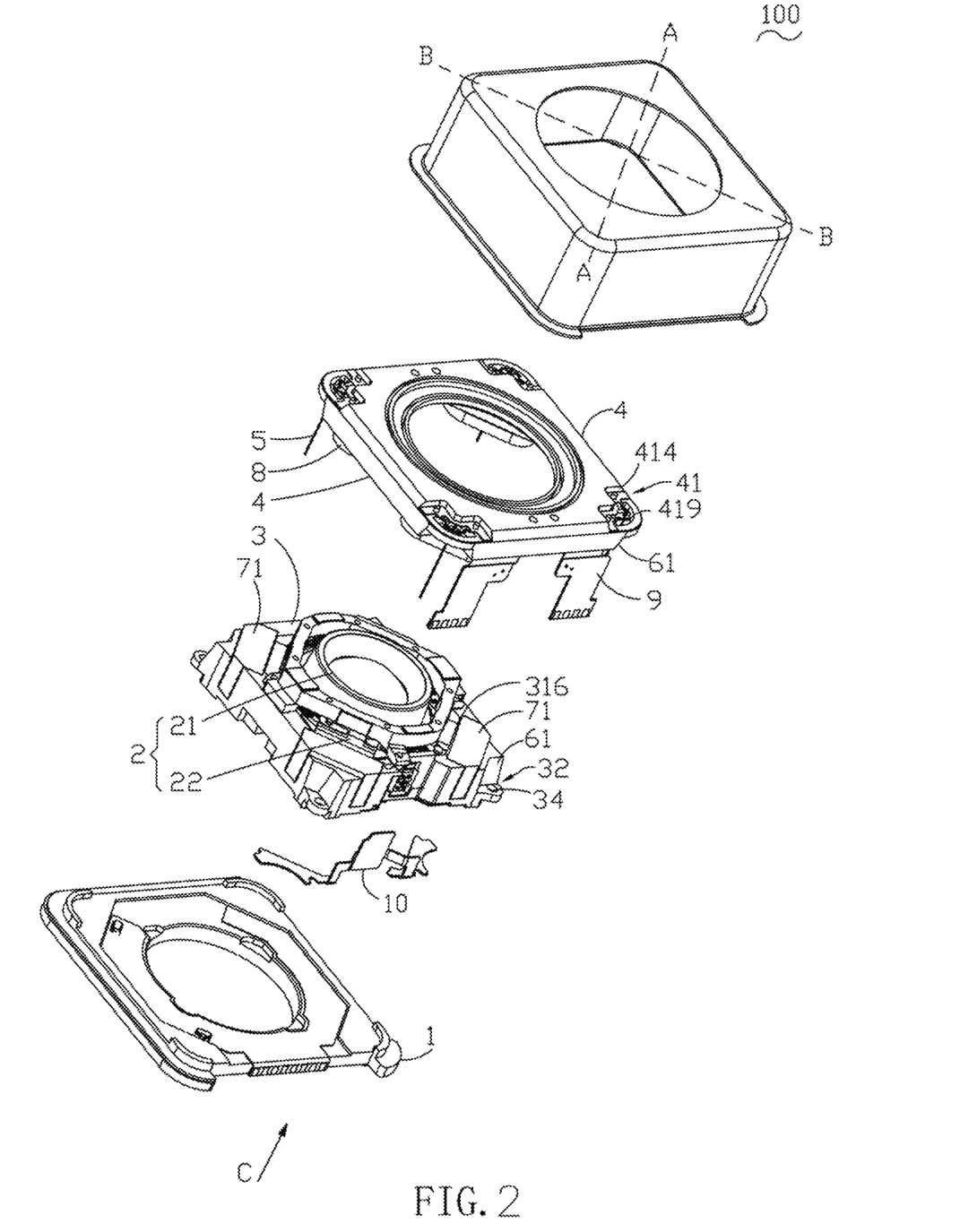
FIG. 2 is a first exploded view of the lens module of the present invention.
Figure 3:
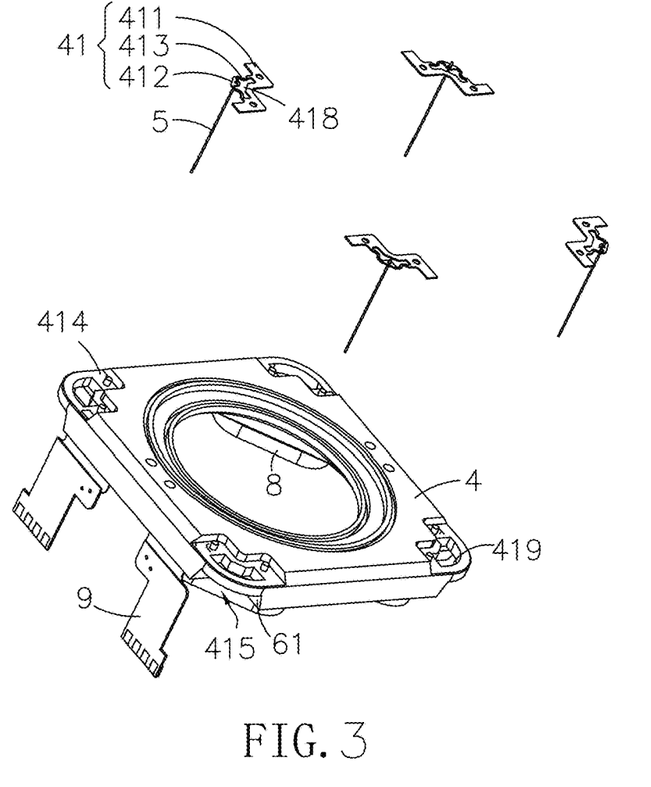
FIG. 3 is an isometric view of a second bracket, suspending wire and elastic plate of the present invention.

As shown in FIGS. 2 and 3, a lens module 100 includes a base 1, a lens assembly set on base 1 2, a first bracket set outside lens assembly 2, a first elastic plate 31 connected to lens assembly 2 and first bracket 3, a second bracket 4 which is set apart from the first bracket 3, suspending wires connected to the first bracket 3 and the second bracket 4 respectively and supports the first bracket 3. Wherein, the lens assembly 2 has an optical axis, and the first bracket 3 and the second bracket 4 are arranged at intervals along the optical axis. The lens module 100 also includes a driving assembly. The driving assembly drives the lens assembly 2 relative to the first bracket 3 to move along the optical axis. The driving assembly also drives the first bracket 3 to drive the lens assembly 2 to move in a direction perpendicular to the optical axis.

Figure 4:
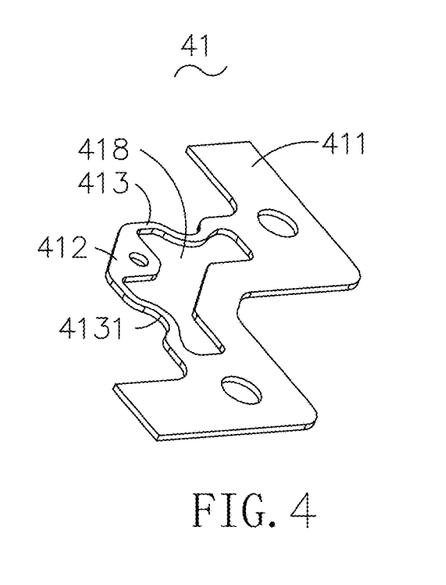
FIG. 4 is an isometric view of the elastic plate of the present invention.
Figure 5:
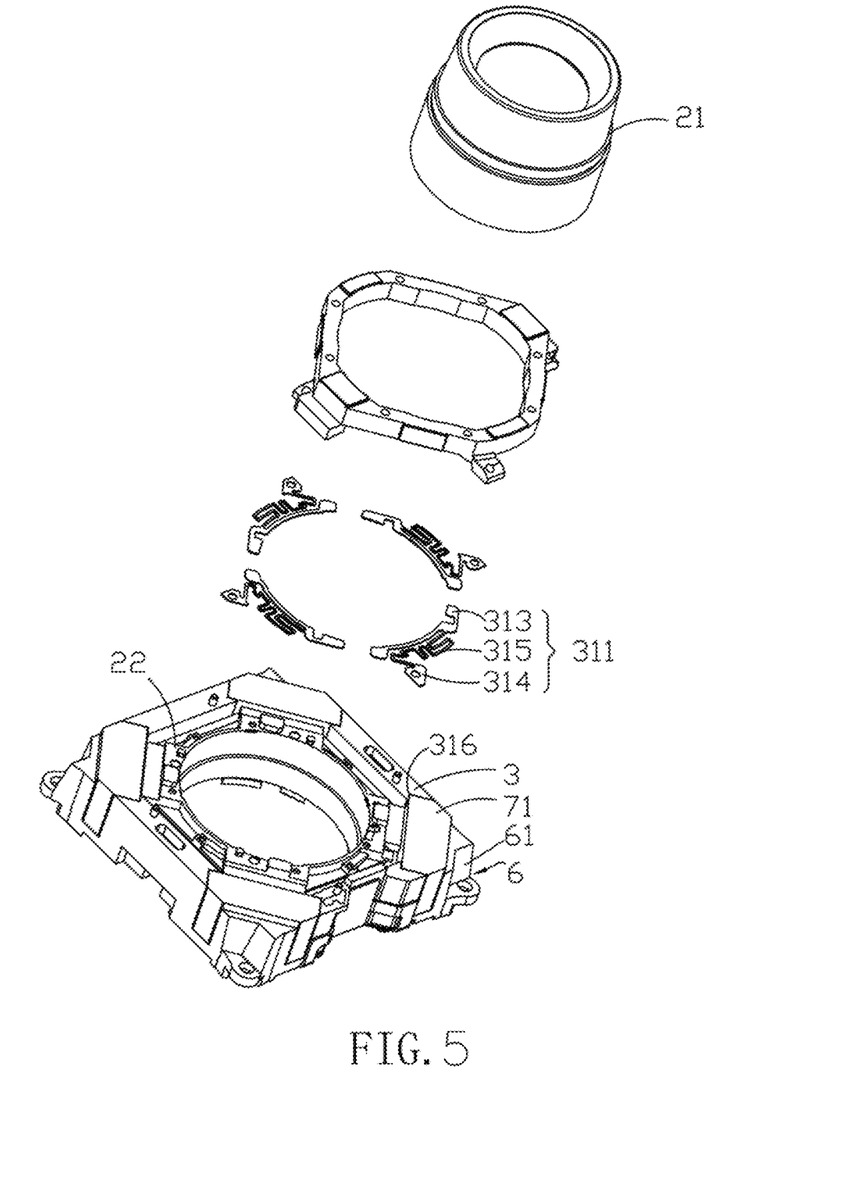
FIG. 5 is an isometric view of a first bracket, magnet, elastic component and lens assembly of the present invention.

The second elastic plate 41 is fixed on the second bracket 4, as shown in FIG. 3 and FIG. 4. The second elastic plate 41 includes a fixed part 411 fixedly connected to the second bracket 4 and a deformation part 412 extending from the fixed part 411 and fixedly connected to the suspending wire 5. Compared with the fixed part 411, the deformation part 412 can undergo elastic deformation along the optical axis to reduce the bending force of the suspending wire 5.

Specifically, there are four second elastic plates 41, and they are arranged symmetrically along the first direction and the second direction, respectively, so that the four second elastic plates 41 are diagonally disposed on the opposite corners of the second bracket 4. By setting multiple relative suspending wire 5 between the first bracket 3 and the second bracket 4, the second bracket 4 is more stable when suspended in the first bracket 3. The second elastic plate 41 connected to the suspending wire 5 is installed at one end of the second bracket 4 of the suspending wire 5. When the second bracket 4 moves along the optical axis relative to the first bracket 3, the aforementioned deformation part 412 moves along the optical axis relative to the fixed part 411 and elastic deformation occurs. In order to reduce the bending force of the suspending wire 5, the bending degree of the suspending wire 5 is reduced. To a certain extent, the stability of the second bracket 4 suspended on the first bracket 3 can be ensured, thereby effectively improving the anti-shake performance of the lens module 100.

More specifically, as shown in FIG. 4, the fixed part 411 is connected to the second bracket 4. The deformation part 412 is suspended on the second bracket 4 in the same plane as the fixed part 411. The second elastic plate 41 also includes a force arm 413 connected between the fixed part 411 and the deformation part 412 to provide displacement support for the deformation part 412 when the deformation part 412 is deformed. Wherein, there are two force arm 413, which respectively extend from the two ends of the deformation part 412 to the fixed part 411 and enclose to form a cavity 418. Of course, the force arm 413, deformation part 412 and fixed part 411 are all on the same plane, which facilitates the deformation of the second elasticity itself. Cavity 418 formed by the enclosed fixed part 411, deformation part 412 and force arm 413 facilitates the deformation of the deformation part 412 when the suspending wire 5 deforms, and improves the elasticity of the suspending wire 5 when it deforms. And through the setting of force arm 413 and cavity 418, suspending wire 5 is more convenient when driving the deformation of second elastic plate 41. In turn, when the suspending wire 5 drives the deformation part 412 to move, the force arm 413 can quickly provide elastic support to the deformation part 412. In turn, the suspending wire 5 is reduced in service life due to repeated excessive deformations.

As shown in FIG. 4, a bending part 4131 that is curved toward the cavity 418 and has a curvature is formed on the force arm 413. Of course, the bending part 4131 can also be bent toward the outside of the cavity 418. In this embodiment, in order to increase the space occupancy rate, the bending part 4131 is set in the cavity 418. Its advantages are that it takes up less space for the lens module 100, requires less materials, and has low production costs. It can be integrated with fixed part 411 and deformation part 412. Through the setting of the bending part 4131, the force arm 413 can provide a certain amount of elastic deformation when the deformation part 412 drives the force arm 413 to deform. Furthermore, the elastic deformation of the suspending wire 5 is realized, the bending force received by the suspending wire 5 is reduced, and the service life of the suspending wire 5 is effectively increased.

Specifically, one end of the force arm 413 is connected to the fixed part 411, the other end is connected to the deformation part 412, and the extension part is located between the two. And the bending part 4131 can be set in an arc shape, or in an S shape, of course, it can also be in a spiral shape, or a shape state that can provide a certain amount of deformation.

As shown in FIGS. 2 and 3, the second elastic plate 41 is embedded in the second bracket 4, and the upper surface of the second elastic plate 41 is lower than the upper surface of the second bracket 4. Set the second elastic plate 41 in the second bracket 4. And the upper surface of the second elastic plate 41 is lower than the upper surface of the second bracket 4, that is, the second elastic plate 41 is trapped in the second bracket 4. In this way, it is difficult for the second elastic plate 41 to affect the movement of the second bracket 4 when it moves.

Specifically, the second bracket 4 is recessed with a sinking groove 414 for the second elastic plate 41 to be assembled. The sinking groove 414 is opened at the position corresponding to the second elastic plate 41. The four sinking grooves 414 are arranged diagonally. The above setting is so that the second elastic plate 41 is completely built into the second bracket 4. It is difficult for the second elastic plate 41 to affect the second bracket 4 when it is moved.

As shown in FIG. 2 and FIG. 3, the number of the above-mentioned suspending wires 5 is four, and the two suspending wires 5 are arranged symmetrically along the first direction and the second direction, respectively. The four suspending wires 5 are arranged diagonally, so that the multiple suspending wires 5 are evenly arranged around the lens assembly 2. In the same way, the second elastic plate 41 connected to the end of the suspending wire 5 is also arranged diagonally and evenly arranged around the lens assembly 2. The purpose of the above arrangement is that the suspending wire 5 supports the uniform arrangement of the lateral restoring force of the second bracket 4. In turn, the second bracket 4 is offset in any direction, and the restoring force is the same, which improves the anti-shake performance of the lens module 100.

As shown in FIG. 2, FIG. 3, FIG. 5 and FIG. 6, the first bracket 3 is provided with a first activity area 32 for the suspending wire 5 to deform. There is a second activity area 415 corresponding to the first activity area 32 on the second bracket 4. Specifically, the first activity area 32 described above is recessed on the side facing the second bracket 4 at the opposite corner of the first bracket 3. There are four first activity area 32 and set corresponding to suspending wire 5. A first through hole 34 that penetrates the first bracket 3 is provided in the active area. The suspending wire 5 passes through the first through hole 34 through the first bracket 3 and is connected to the first inserted member 33 provided in the first bracket 3.

The second activity area 415 described above is recessed on the side of the second bracket 4 facing the first bracket 3 at the opposite corner. There are four second activity area 415 and set corresponding to suspending wire 5. There is a second through hole 419 through the second bracket 4 in the active area. The suspending wire 5 passes through the second through hole 419 through the second bracket 4 and is connected to the second inserted member 416 provided in the second bracket 4.

More specifically, a first activity area 32 and a second activity area 415 are opened. When the second bracket 4 moves, the first activity area 32 and the second activity area 415 provide a certain moving space for the movement of the suspending wire 5. Reduce the occurrence of damage caused by touching the first bracket 3 or second bracket 4 due to the movement of the suspending wire 5.

Both the inner wall of the first activity area 32 and the inner wall of the second activity area 415 are provided with an inclined plane 6 inclined from the suspending wire 5 toward the optical axis. Set the inclined plane 6 on the inner wall of the first activity area 32 and the inner wall of the second activity area 415. In order to provide a certain moving space for the suspending wire 5 when the suspending wire 5 is driven by the second bracket 4 and tilted. It also reduces the occurrence of damage caused by the movement of the suspending wire 5 due to touching the first bracket 3 or the second bracket 4. In addition, the first activity area 32 and the second activity area 415 are filled with damping glue for wrapping the suspending wire 5 (not shown in the figure). Inclined plane 61 is set on the first activity area 32 and the second activity area 415 to increase the bonding area of the first bracket 3 and second bracket 4 and the damping glue to the greatest extent, enhancing the bonding strength of the damping glue and suppressing resonance.

Figure 6:
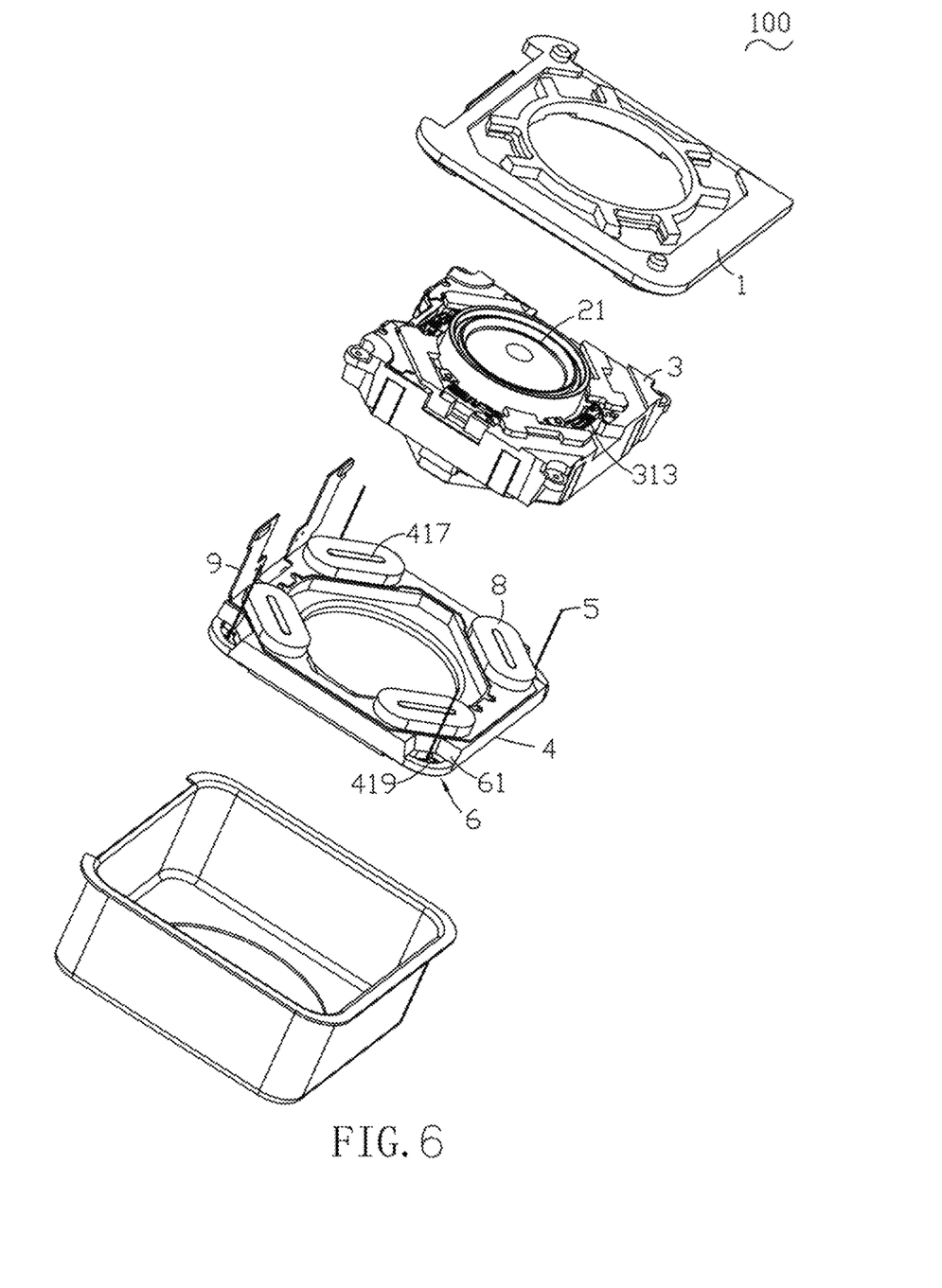
FIG. 6 is a view shown from an aspect C in FIG. 2.
Figure 8:
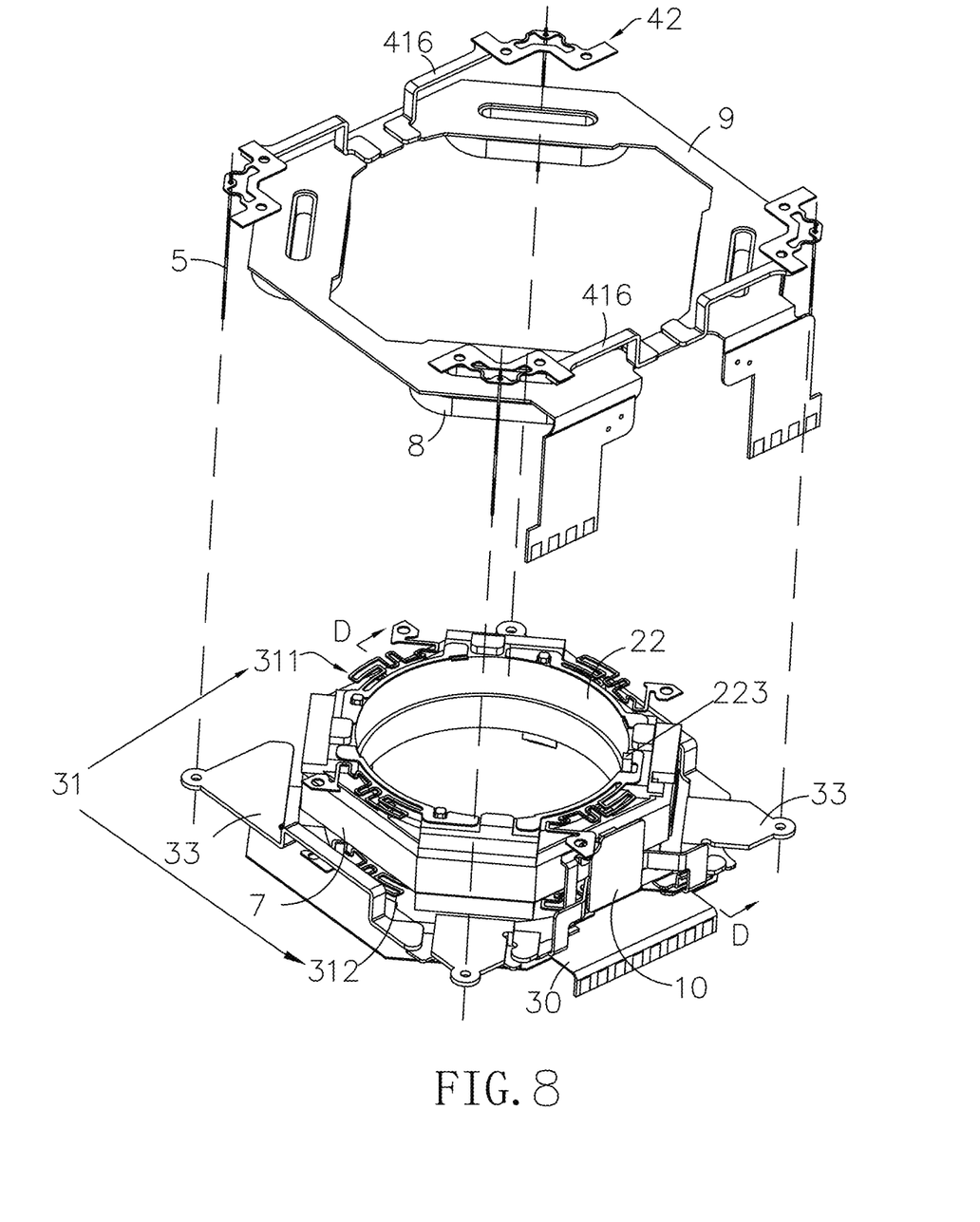
FIG. 8 is an isometric view of an electrical circuit of the lens module of the present invention.

As shown in FIGS. 2, 6 and 8, the driving assembly includes a first driving assembly that drives the lens assembly 2 to move in the direction of the optical axis and a second driving assembly that drives the first bracket 3 to move in the direction perpendicular to the optical axis. The first driving assembly includes a first coil 7 wound on the outside of the lens assembly 2 and a magnet 71 arranged opposite to the first coil 7 at an interval. The magnet 71 is set on the first bracket 3. Wherein, the number of magnet 71 is four. The first bracket 3 is recessed with four assembly slots 316 for the magnet 71 to be inserted into. And the opening of the assembly slot 316 faces the second bracket 4. In addition, the four assembly slots 316 are arranged symmetrically in the first direction and the second direction respectively in pairs, so that the four assembly slots 316 are arranged diagonally. Furthermore, the magnet 71 assembled in the assembly slot 316 is also arranged diagonally, so that the coils corresponding to the magnet 71 are also arranged diagonally. The magnet 71 cooperates with the first coil 7 to drive the lens assembly 2 to move along the optical axis. The first coil 7 is mainly used to provide different currents according to the offset of the lens assembly 2 to drive the movement of the lens assembly 2 relative to the first bracket 3 and change the position of the lens assembly 2. The main principle is that the power-on first coil 7 interacts with the magnet 71, and the first bracket 3 drives the lens assembly 2 in the first bracket 3 to move. Realize the jitter correction of the lens module 100 in the optical axis direction.

The second driving assembly includes a second coil 8 fixed on a second bracket 4. The second coil 8 is set directly opposite to the magnet 71. The magnet 71 cooperates with the second coil 8 to drive the lens assembly 2 to move in a direction perpendicular to the optical axis. The second coil 8 is mainly used to provide different currents according to the offset of the lens assembly 2 to drive the movement of the lens assembly 2 relative to the first bracket 3 and change the position of the lens assembly 2. The main principle is that the second coil 8 and the magnet 71 interact with each other when energized. The first bracket 3 drives the lens assembly 2 in the first bracket 3 to move in the direction perpendicular to the optical axis, so as to realize the jitter correction of the lens module 100 in the direction perpendicular to the optical axis.

Wherein, referring to FIG. 6, the second bracket 4 is provided with a bump 417 protruding toward the first bracket 3. A first circuit board 9 is clamped on the side of the second bracket 4 facing the first bracket 3. The second coil 8 is connected to the bump 417 and electrically connected to the first circuit board 9. The number of second coil 8 is four and is set in one-to-one correspondence with the magnet 71 described above. And the four second coils 8 are all ring-shaped. More specifically, the second coil 8 may have a racetrack shape, and the four second coils 8 have the same size. Using bump 417 to fix it can avoid the use of glue and other adhesives. The installation method is simple, which improves the product yield, and the second coil 8 has a better heat dissipation effect.

Specifically, both the first coil 7 and the second coil 8 are coils wound with enameled wire, and the coils can be directly exposed to the air. There is no need to use glue to wrap. When the coil is energized, the heat dissipation is better, and the ability to withstand large currents is stronger.

Figure 9:
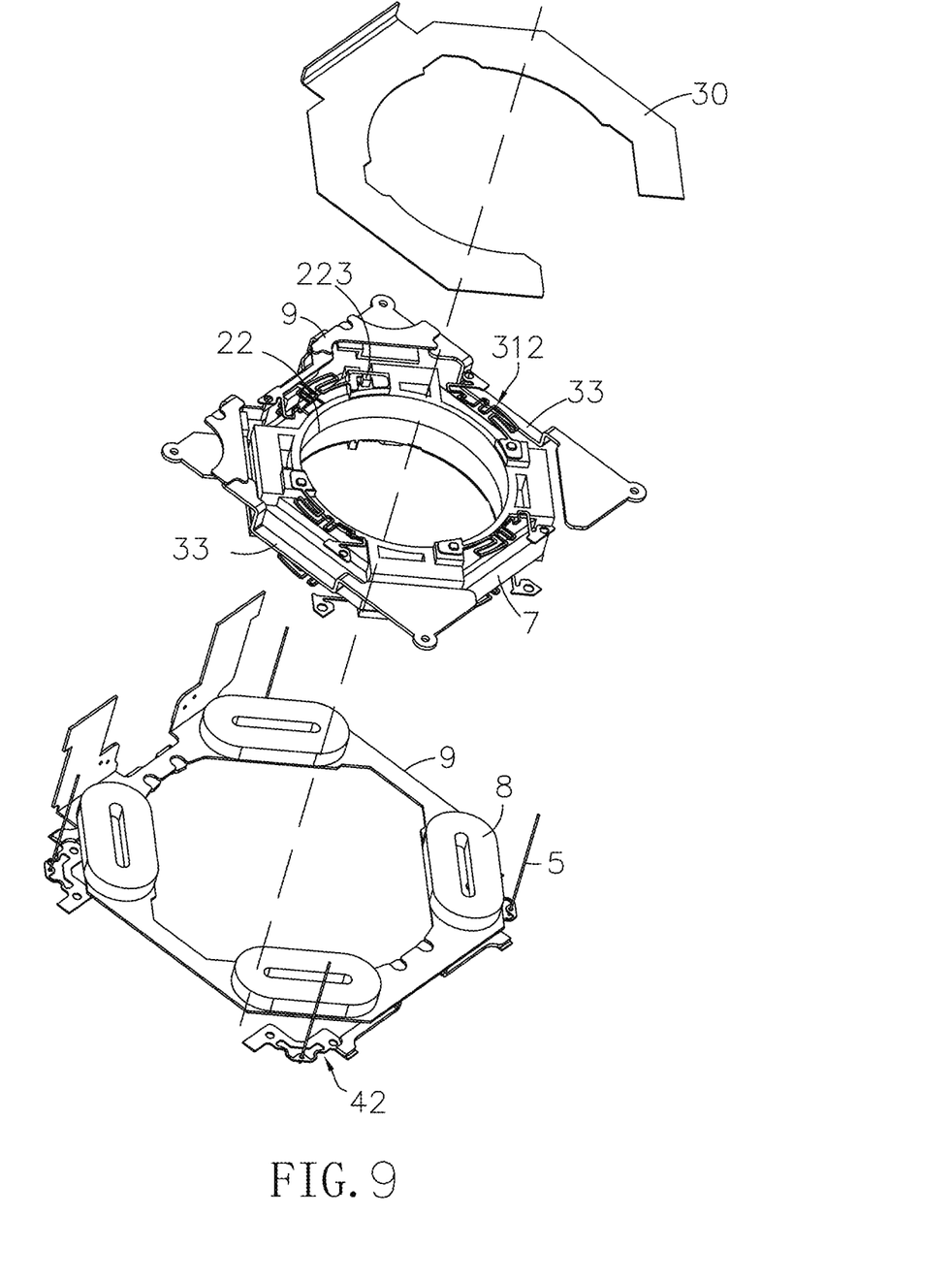
FIG. 9 is another isometric view of the electrical circuit of the lens module of the present invention.

As shown in FIGS. 8 and 9, the lens module 100 also includes an electrical circuit (not marked in the figure) for providing power support to the lens module 100. The electrical circuit includes a first inserted member 33 embedded in the first bracket 3, a second inserted member 416 embedded in the second bracket 4, and a circuit connector 10 connected to the first inserted member 33. Wherein, one end of each suspending wire 5 connected to the first bracket 3 is connected with a first inserted member 33 through the second elastic plate 41. One end connected to the second bracket 4 is connected with a second inserted member 416.

As mentioned above, the first inserted member 33 and the second inserted member 416 are respectively set in the first bracket 3 and second bracket 4 to reduce the space occupied by the lens module 100 by the first inserted member 33 and the second inserted member 416 used for the transfer circuit. Further improve the integration of lens module 100. In addition, in this embodiment, the first circuit board 9, the first inserted member 33, the second elastic plate 41, the suspending wire 5 and the circuit connector 10 form an electrical circuit. And in this embodiment, all the above-mentioned elements can be used for conduction. Furthermore, the original parts in the lens module 100 are used to the greatest extent for functional expansion, so that the lens module 100 is electrically conductive without increasing the number of parts in the lens module 100.

As shown in FIGS. 2, 8 and 9, the lens assembly 2 includes a lens 21 and a lens holder 22. The first elastic plate 31 includes an upper elastic plate 311 and a lower elastic plate 312 that are relatively set. The upper elastic plate 311 is located on the side of the first bracket 3 facing the second bracket 4. One end of the upper elastic plate 311 is connected to the first bracket 3, and the other end is connected to the lens holder 22. The lower elastic plate 312 is arranged on the side of the first bracket 3 away from the second bracket 4, and one end of the lower elastic plate 312 is connected to the first bracket 3, and the other end is connected to the lens holder 22. There are four upper elastic plates 311, and the four upper elastic plates 311 form a square configuration. There are also four lower elastic plate 312, and the four lower elastic plate 312 are enclosed in a square configuration. Each of the above upper elastic plate 311 and lower elastic plate 312 includes a first end 313 fixed to the first bracket 3, a second end 314 fixed to the lens holder 22, and an elastic arm 315 connected to the first end 313 and the second end 314.

Figure 10:
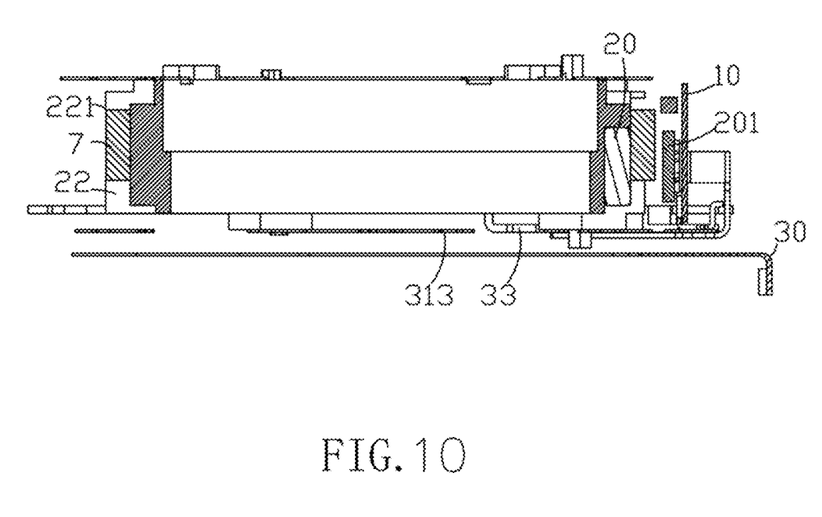
FIG. 10 is a cross-sectional view taken along line D-D in FIG. 8.

As shown in FIGS. 8-10, the side wall of the lens holder 22 is recessed and formed with an annular groove 221 for fitting the first coil 7 wound on the lens holder 22. The annular groove 221 is provided to reduce the volume of the assembly of the first coil 7 and the lens holder 22. An upper winding column 222 is provided on the side of the lens holder 22 facing the second bracket 4. A lower winding column 223 is provided on the side of the lens holder 22 facing the base 1. Both upper winding column 222 and lower winding column 223 are set close to circuit connector 10.

Wherein, an upper elastic plate 311 and a lower elastic plate 312 arranged close to the circuit connector 10 are electrically connected to the upper winding column 222 and the lower winding column 223, respectively. The positive and negative poles of lens 21 are connected to upper winding column 222 and lower winding column 223 respectively. The power-on circuit of lens 21 is realized by circuit connector 10, upper elastic plate 311, lens 21 and lower elastic plate 312.

As shown in FIGS. 2, 8 and 10, the lens module 100 also includes a first position detection unit set in the first bracket 3. The first position detection unit is used to detect the moving position of lens assembly 2 along the optical axis. Wherein, the first detection unit includes a hall magnet 20 and a first hall sensor 201 embedded in the lens barrel bracket. The Hall magnet 20 is arranged between the first coil 7 and the lens holder 22 and is arranged directly opposite to the circuit connector 10. The first hall sensor 201 is arranged on the side of the circuit connector 10 facing the lens holder 22, and is arranged opposite to the Hall magnet 20. The offset of the Hall magnet 20 is sensed by the first hall sensor 201, so as to correct the jitter offset of the lens module 100 in the optical axis direction.

Figure 7:
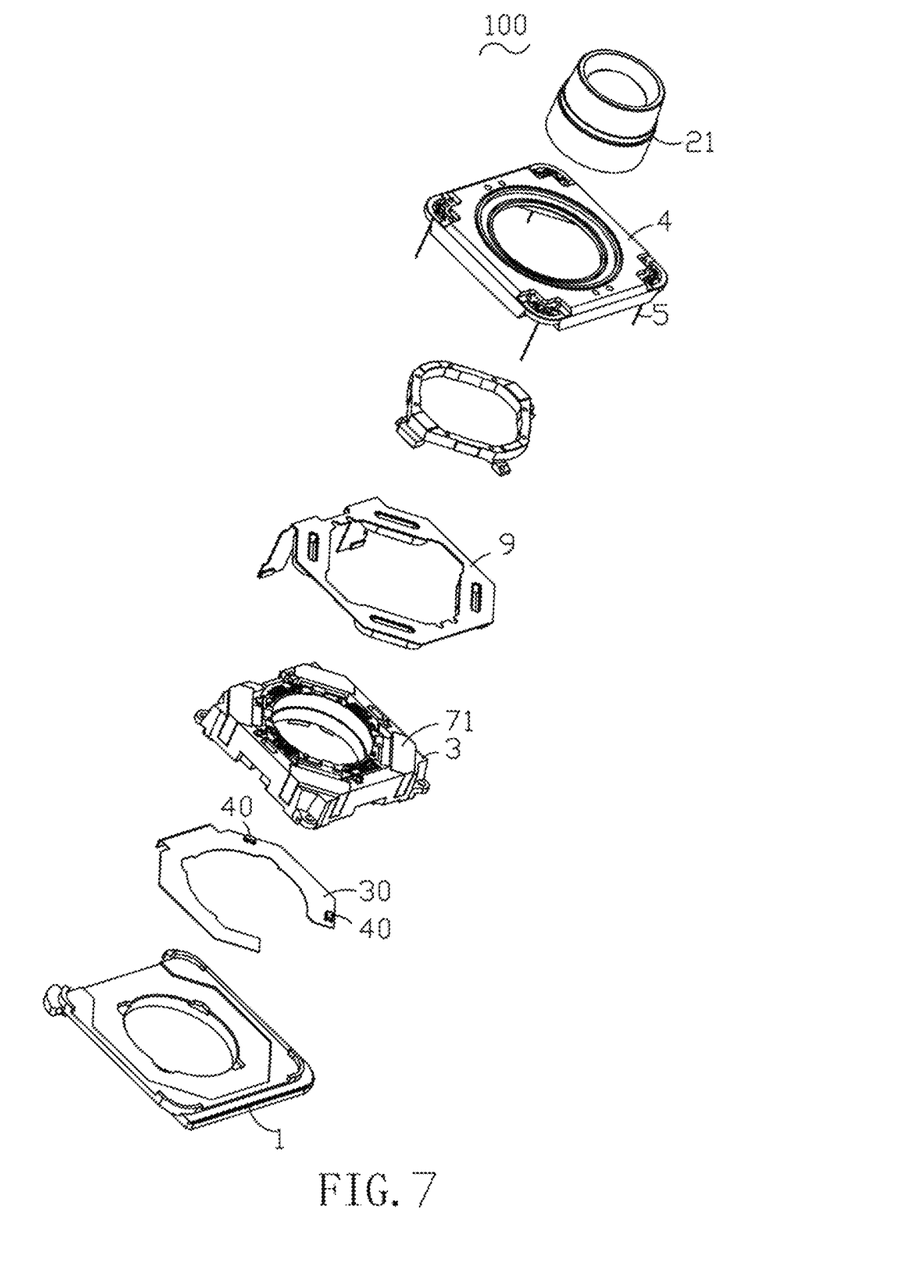
FIG. 7 is a second exploded view of the lens module of the present invention.

As shown in FIG. 7, the lens module 100 also includes a second position detection unit located under the first bracket 3. The second position detection unit is used to detect the moving position of the lens assembly 2 along the direction perpendicular to the optical axis. Wherein, on the side of base 1 facing the first bracket 3, a second circuit board 30 is provided. The second position detection unit includes a second hall sensor 40 corresponding to magnet 71. The second hall sensor 40 is electrically connected to the second circuit board 30. The offset of the magnet 71 is sensed by the second hall sensor 40 to correct the jitter offset of the lens module 100 perpendicular to the optical axis.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:
1. A lens module, including:
a lens assembly having an optical axis;
a first bracket sleeved outside the lens assembly;
a first elastic plate connecting the lens assembly and the first bracket for suspending the lens assembly in the first bracket;
a second bracket opposed from the first bracket along the optical axis;
a suspending wire respectively connecting the first bracket and the second bracket and suspending and supporting the second bracket;
a driving assembly for driving the lens assembly to move along the optical axis relative to the first bracket, and for driving the lens assembly to move in a direction perpendicular to the optical axis;
wherein the driving assembly includes a first driving assembly that drives the lens assembly to move in a direction of an optical axis and a second driving assembly that drives a first bracket to move in a direction perpendicular to the optical axis; the first driving assembly includes a first coil wound on the outside of the lens assembly and a magnet arranged at a distance from the first coil, and the magnet is arranged on the first bracket; the second driving assembly includes a second coil fixed on the second bracket; the second coil is directly opposite to the magnet;
wherein further including a first position detection unit arranged in the first bracket for detecting the moving position of the lens assembly along the optical axis; wherein a second elastic plate is fixed on the second bracket, and includes a fixed part fixedly connected to the second bracket and a deformation part extending from the fixed part and fixedly connected to the suspending wire; the deformation part performs elastic deformation along the optical axis relative to the fixed part for reducing the bending force of the suspending wire.

2. The lens module as described in claim 1, further including an electric circuit for providing power support to the lens module, wherein the electric circuit includes:

a first inserted member embedded in the first bracket, and electrically connected to an end of the suspending wire connected to the first bracket;

a second inserted member embedded in the second bracket, and electrically connected to another end of the suspending wire connected to the second bracket; and a circuit connector arranged on the first bracket and electrically connected with the first inserted member.

3. The lens module as described in claim 2, wherein the lens assembly includes a lens and a lens holder; the first elastic plate includes an upper elastic plate and a lower elastic plate opposite to the upper elastic plate;

the upper elastic plate locates on a side of the first bracket facing the second bracket with one end thereof connected to the first bracket and another end connected to the lens holder;

the lower elastic plate locates on a side of the first bracket away from the second bracket with one end thereof connected to the first bracket and another end connected to the lens holder.

4. The lens module as described in claim 3, wherein the upper elastic plate, the lower elastic plate and the lens are electrically connected; the upper elastic plate and the lower elastic plate are also electrically connected to the circuit connector and electrically connected to the electrical circuit through the circuit connector.

5. The lens module as described in claim 1, wherein the first bracket includes a first activity area for deforming the suspending wire; the second bracket includes a second activity area corresponding to the first activity area.

6. The lens module as described in claim 5, wherein both an inner wall of the first activity area and an inner wall of the second activity area are provided with an inclined plane inclined from the suspending wire toward the optical axis; both the first activity area and the second activity area are filled with damping glue for wrapping the suspending wire; the damping glue is used for providing buffer to the suspending wire.

7. The lens module as described in claim 1, further including a second position detection unit located below the first bracket for detecting the moving position of the lens assembly in a direction perpendicular to the optical axis.

8. The lens module as described in claim 1, wherein the second elastic plate further includes a force arm connected between the fixed part and the deformation part for providing displacement support for the deformation part when the second elastic plate is deformed.

* * * * *